No. 616,349. Patented Dec. 20, 1898.
J. PARKER.
BICYCLE DRIVE GEAR.
(Application filed Apr. 8, 1898.)
(No Model.)
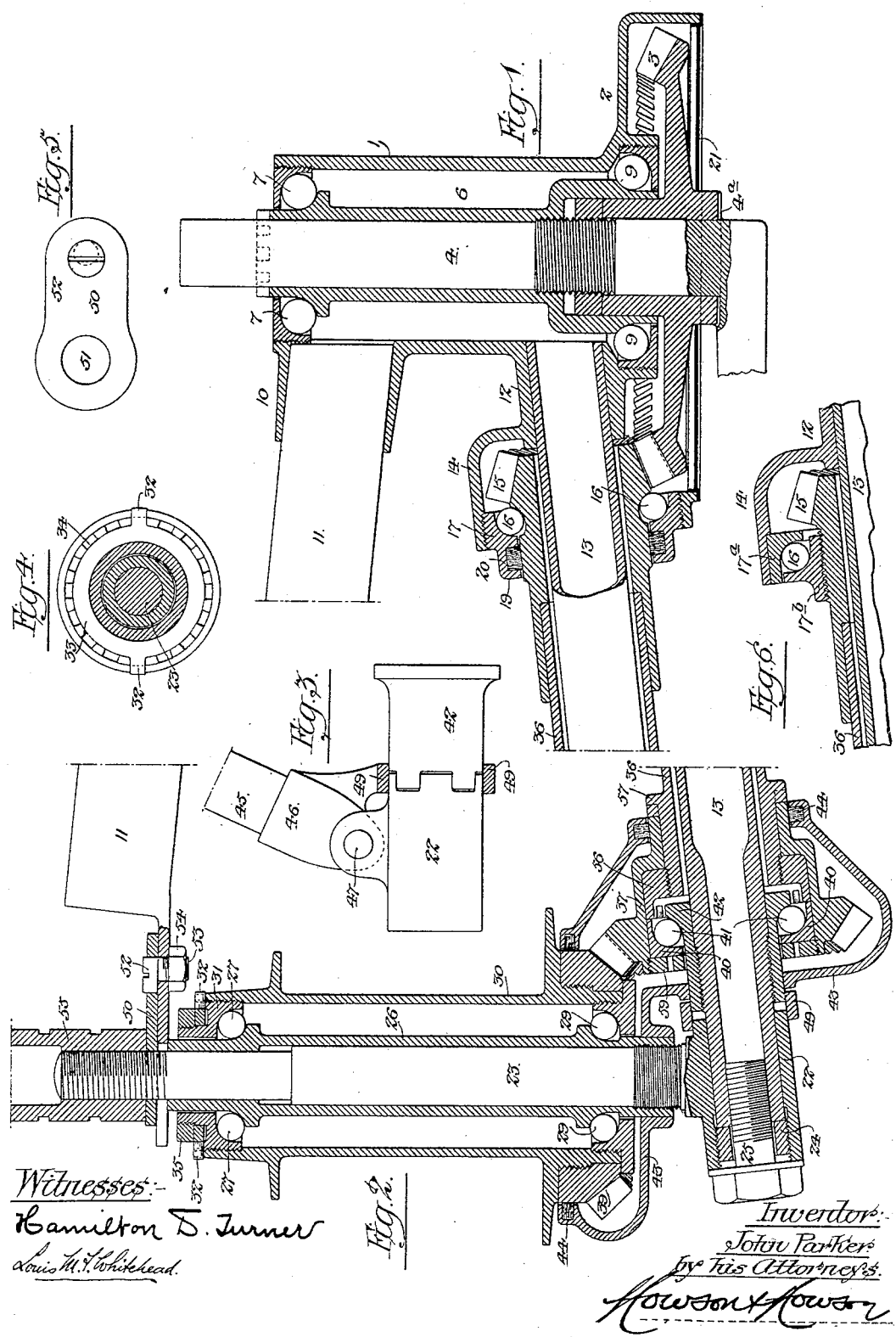
Witnesses:
Hamilton D. Turner
Louis M. Whitehead
Inventor:
John Parker
by his Attorneys
Howson & Howson
THE NORRIS PETERS CO., PHOTO-LITHO., WASHINGTON, D. C.

UNITED STATES PATENT OFFICE.

JOHN PARKER, OF PHILADELPHIA, PENNSYLVANIA, ASSIGNOR OF ONE-HALF TO PASCHALL HOLLINGSWORTH MORRIS, OF SAME PLACE.

BICYCLE DRIVE-GEAR.

SPECIFICATION forming part of Letters Patent No. 616,349, dated December 20, 1898.

Application filed April 8, 1898. Serial No. 676,937. (No model.)

*To all whom it may concern:*

Be it known that I, JOHN PARKER, a subject of the Queen of Great Britain and Ireland, residing in Philadelphia, Pennsylvania, have invented certain Improvements in Bicycle Drive-Gear, of which the following is a specification.

My invention consists of certain improvements in bevel or tooth geared bicycles—such, for instance, as that for which I obtained Letters Patent No. 561,516, dated June 2, 1896—my present improvements relating to certain details of construction, the character and purpose of which will be fully set forth hereinafter.

In the accompanying drawings, Figure 1 is a sectional plan view of the crank-hanger with the crank and forward elements of the driving-gear. Fig. 2 is a sectional plan view of the driving-wheel hub with the rear axle and the rear elements of the driving-gear. Fig. 3 is a side view, partly in section, of part of the rear construction. Fig. 4 is a view illustrating a device employed for locking one of the ball-races of the driving-wheel bearing. Fig. 5 is a side view of a rear-axle-adjusting device constituting part of my present invention, and Fig. 6 is a sectional view illustrating a modification of part of the invention.

The crank-hanger of the bicycle is represented at 1, this hanger being enlarged at one end, as shown at 2, so as to form a casing for containing the bevel-wheel 3, which is secured to the crank-shaft 4, the hub of the bevel-wheel having teeth or projections engaging with recesses in the collar 4ª of the crank, as shown in Fig. 1, and being held in engagement therewith by means of a nut 5, adapted to a threaded portion of the crank-shaft and bearing upon the inner face of the hub of the bevel-wheel. The threaded portion of the crank-shaft 4 also screws into a threaded opening in a sleeve 6, which has enlargements forming the inner races for two series of balls 7 and 9, the outer races for the same being screwed into threaded openings in the crank-hanger 1, as shown in Fig. 1.

The crank-hanger 1 has near one end a rearwardly-projecting hollow boss 10, to which the forward end of one of the lower forks 11 of the bicycle is brazed or otherwise firmly secured, and said crank-hanger also has another hollow boss 12, to which is brazed or otherwise firmly secured the forward end of a hollow brace-rod 13, said boss 12 being enlarged at the rear end, as shown at 14, so as provide a chamber for the reception of the pinion 15, with which the bevel-wheel 3 engages, the hub of the pinion or other available element of the gearing forming an inner race for a series of balls 16, which turn in an outer race 17, screwed into the threaded rear end of the enlarged portion 14 of the hollow boss 12, so that it is readily accessible for purposes of adjustment or can be readily removed when it is desired to gain access to the balls or to withdraw the pinion 15 from engagement with the bevel-wheel 3, access to the balls being effected without interfering with the adjustment of either the wheel or pinion and the withdrawal of the pinion 15 being effected without change in the position of the wheel 3.

The ball-race 17 has a rearwardly-projecting portion 19, grooved for the reception of an annular washer 20, of felt or other equivalent material, which bears upon the hub of the pinion 15 or other projecting element of the gearing and prevents the access of dust or dirt to the casing containing the toothed wheels, the outer portion of the enlargement 2 of the crank-hanger being closed by a plate 21 for a like purpose.

The construction of forward bearing shown in Fig. 6 may, if desired, be adopted in place of that shown in Fig. 1. In said modified construction an inner ball-race 17ª is adjustable on the hub of the pinion, and the outer ball-race is adapted to a seat in the enlarged open end of the boss 12 of the crank-hanger, the facility for adjustment being substantially the same. Hence so long as the rear ball-race of this bearing is adjustable and accessible it is immaterial whether said rear ball-race is the outer or inner race of the bearing. It will be understood, of course, that the ball-race 17ª is removable from this seat, but fits so snugly therein that it cannot turn.

The rear end of the hollow brace-rod 13 passes through a bearing-block 22, secured to or forming part of one end of the rear axle 23, an annular nut 24, adapted to an internally-threaded opening at the rear end of said block bearing upon the rear end of the brace-rod 13, which is also internally threaded for the reception of a bolt 25, having a head bearing upon the rear end of the block 22.

The rear axle 23 has a threaded portion adapted to a threaded opening in one end of a sleeve 26, which has projections forming inner ball-races for two sets of balls 27 and 29, the outer races for these balls being screwed into the opposite ends of the hub 30 of the rear or driving wheel of the machine, and one of said outer ball-races (indicated at 31 in Fig. 2) being adjustable, so as to compensate for wear or otherwise secure the best running conditions of the bearing.

The end of the hub 30 into which the ball-race 31 is screwed has in its outer edge one or more pairs of notches for the reception of one or more lugs 32 on an annular washer 33, said lugs also engaging with opposite recesses of a series of recesses 34, formed in a projecting flange of the ball-race 31, as shown in Fig. 4, said ball-race also having a projecting hub threaded for the reception of a nut 35, which bears upon the annular washer 33 and serves to maintain it in such position that its lugs 32 will engage with recesses both of the wheel-hub and flange of the ball-race, so as to effectually lock said ball-race to the hub after it has once been properly adjusted in respect thereto. This device for locking the ball-race may also be used in connection with other parts of the bicycle than the hub of the wheel.

The hub of the bevel-wheel 15 is secured to the forward end of a tubular shaft 36, which surrounds the hollow brace-rod 13, the rear end of said tubular shaft 36 being secured to the hub of a bevel-wheel 37, which meshes with a bevel-pinion 39, secured to the hub 30 of the driving-wheel, said bevel-wheel 37 having a fixed internal ball-race 40 for the reception of a series of balls 41, which run upon a ball-race 42, screwed upon a threaded portion of the brace-rod 13, so as to be adjustable thereon, as shown in Fig. 2. The hollow shaft 36 can therefore, by proper adjustment of the ball-races 17 and 42, be so adjusted as to insure the proper engagement of the bevel-wheel 3 and pinion 15, and when this has been accomplished the adjustment of the pinion 39, so as to properly mesh with the bevel-wheel 37, can be effected by a proper manipulation of the nut 24 and bolt 25, such manipulation effecting forward or rearward adjustment of the block 22 on the rear end of the brace-rod 13 until the teeth of said bevel-wheel 37 and pinion 39 properly mesh one with the other.

Delicate adjustments of the ball-races themselves can be effected by manipulation of the ball-race 17, which is always accessible from the outside of the crank-hanger.

The gearing at the rear end of the machine is inclosed by a casing 43, preferably made in halves for convenience of application and removal, said casing having felt washers 44, bearing upon the rotating elements of the driving device, so as to prevent the access of dust and dirt to the ball-bearings therefor.

The lower end of the rear fork 45 of the bicycle-frame is secured to a head 46, and the latter is secured by a transverse pin or bolt 47 to a suitable lug or lugs upon the block 22; but in order to provide for the proper support of the rear end of the brace-rod 13 and the gearing carried thereby when the rear wheel with its axle and block 22 are removed from the machine I provide said head 46 of the rear fork 45 with a depending ring 49, which embraces the projecting rear end of the ball-race 42 and also the forward end of the block 22, these parts being preferably provided with engaging tongues and recesses, as shown in Fig. 3, so that the block serves as a means of locking the ball-race 42 in position after the latter has been properly adjusted upon the rear end of the brace-rod 13. When, therefore, the block 22 is detached from the head 46 and withdrawn, with the rear wheel and axle, from the frame of the machine, the ring 49 still serves as a means of supporting the ball-race 42 and the rear end of the brace-rod 13, upon which said ball-race is mounted, so that the dropping or springing of this part of the frame out of its proper relation to the other parts of the fixed frame is effectually prevented.

The rear end of the lower fork 11 of the machine is slotted, as usual, for the longitudinal insertion and withdrawal of the projecting end of the axle 23 in applying the rear wheel to or removing it from the frame of the machine, and in order to provide for delicate adjustment of this end of the axle in respect to the lower fork, as well as its accurate readjustment after removal, I provide a washer 50, which, as shown in Fig. 5, has an opening 51 fitting snugly to the projecting end of the axle 23, the washer also having another opening for the reception of the head 52 of a bolt 53, which is secured by a nut 54 to the rear end of the lower fork 11 of the frame, said head 53 being eccentrially disposed in respect to the stem of the bolt, as shown in Figs. 2 and 5, so that by turning the bolt in its bearing at the rear end of the fork 11 the washer 50 can be moved back and forth on said rear end of the fork, thus carrying with it the projecting end of the axle 23 in order to provide for the proper adjustment of the rear wheel in the frame of the machine. After having been properly set the bolt 53 can be secured in position by tightening the nut 54.

When it is desired to remove the rear wheel from the frame of the machine, the step 55, which is screwed upon the projecting threaded stem 23, is backed off sufficiently to permit the washer 50 to be disengaged from the eccentric head 52 of the bolt 53, whereupon the washer can be withdrawn rearwardly along with the axle, and when the latter is reapplied to the frame the reëngagement of the opening at the forward end of the washer with the head of the bolt 53 will insure the desired accurate readjustment of the axle to its proper position on that side of the frame.

It will be evident that a construction the reverse of that shown can be used to accomplish the same purpose—that is to say, the washer may carry the eccentric-headed bolt and the opening for the reception of the said head may be formed in the fork.

By using an external ball-race for the hub of the bevel-pinion 15 I am enabled to make said bevel-wheel 15 of smaller diameter than in the previously-patented construction, in which the ball-bearing was on the inside of the bevel-wheel, while at the same time I can use an internal brace-rod 13 of large diameter, so that it can be hollow and light and yet amply strong. Furthermore, the removable member of said external bearing is readily accessible both for adjustment and for removal when it is desired to detach the bevel-wheel 15 from the casing.

The bevel-wheel 37 is retained in position longitudinally on the rear end of the tubular shaft 36 by means of a nut 56, screwed onto the threaded end of said tubular shaft and bearing against an internal shoulder in the hub of said bevel-wheel 37, the forward end of said hub being preferably provided with tongues adapted to suitable recesses in a clutch-collar 57 on the tubular shaft 36, as shown by dotted lines in Fig. 2.

The rear ball-race 40 in the bevel-wheel 37 is held in place by an annular retaining-ring 59, screwed into a threaded opening in the rear end of the hollow hub of the wheel, so that said ball-race is detachable, and the bevel-wheel itself can also be removed from the rear end of the shaft 36 without removing the shaft itself from the frame of the machine.

If the brace 13 is solid instead of hollow, I may instead of using the locking-bolt 25 at the rear end of the brace extend the reduced and threaded end of the brace through the tubular nut 24 and provide it with a nut bearing against the rear end of the block 22, the use of the hollow brace and locking-bolt being, however, preferred in all cases.

Having thus described my invention, I claim and desire to secure by Letters Patent—

1. In driving mechanism for bicycles and the like, a crank-shaft having a toothed wheel thereon, a brace-rod secured to the crank-hanger and to the rear structure of the bicycle, a tubular shaft surrounding said brace-rod and having a toothed wheel thereon adapted to engage with the toothed wheel on the crank-shaft, and an external ball-bearing for said tubular shaft having a removable rear ball-race capable of being moved rearwardly along the tubular shaft when detached, substantially as specified.

2. In a driving mechanism for bicycles and the like, a crank-shaft having a toothed wheel thereon, a brace-rod secured to the crank-hanger and to the rear structure of the bicycle, a tubular shaft surrounding said brace-rod and having a toothed wheel thereon adapted to engage with the toothed wheel on the crank-shaft, and an external ball-bearing for said tubular shaft having a removable rear outer ball-race mounted in the crank-hanger casing and capable of being moved rearwardly along the tubular shaft when detached, substantially as specified.

3. In a driving mechanism for bicycles and the like, a crank-shaft having a toothed wheel thereon, a brace-rod secured to the crank-hanger and to the rear structure of the bicycle, a tubular shaft surrounding said brace-rod and having a toothed wheel thereon adapted to engage with a toothed wheel on the crank-shaft, and a bearing for said tubular shaft outside of the same and in a rearwardly-projecting part of the crank-hanger, substantially as specified.

4. The combination in a geared bicycle, of a crank-shaft having a toothed wheel thereon, a brace-rod secured to the crank-hanger and to the rear structure of the bicycle, a tubular shaft surrounding said brace-rod and having a toothed wheel thereon engaging with said toothed wheel on the crank-shaft, a crank-hanger having an enlargement containing a chamber for the reception of the toothed wheel of the crank-shaft and a rearwardly-extending boss containing a chamber for the reception of the toothed wheel engaging therewith, a plate inclosing said enlarged end of the crank-hanger and a removable ball-race closing the end of the rearwardly-extending boss of said hanger and capable of being slipped rearwardly along the tubular shaft when removed from said hanger, substantially as specified.

5. The combination in a bevel-geared bicycle, of the hollow longitudinal shaft for transmitting power from the crank-shaft to the driving-wheel, a brace extending through said shaft and connected at the forward end to the crank-hanger and passing at the rear end through a block on the rear axle, a nut adapted to an internally-threaded opening in said block and exerting forward pressure upon said brace and a bolt or nut adapted to a threaded portion of the brace and bearing against the rear end of the block, substantially as specified.

6. The combination in a geared bicycle, of the tubular longitudinal shaft for transmitting the power of the crank-shaft to the rear driving-wheel, a brace-rod passing through said tubular shaft and secured at its forward end to the crank-hanger and passing at its rear end into a tubular block on the rear axle, an inner ball-race adjustably mounted on said brace-rod, an adjusting-nut adapted to an internally-threaded opening in said block and exerting forward pressure upon the brace, and a bolt or nut engaging with the threaded portion of the brace and bearing against the rear end of the block, substantially as specified.

7. The combination in a geared bicycle, of a tubular longitudinal shaft whereby the power of the crank-shaft is transmitted to the hub of the rear driving-wheel, a brace-rod extending through said shaft and connected at its forward end to the crank-hanger and supported at its rear end by a block on the rear axle, and a rear fork having a projecting portion also providing for the support of the rear end of the brace-rod independently of the axle-block, substantially as specified.

8. The combination in a geared bicycle, of the tubular longitudinal shaft whereby power is transmitted from the crank-shaft to the driving-wheel, a brace-rod extending through said shaft and secured at its forward end to the crank-hanger and carried at its rear end by a non-rotatable support, a ball-race adjustable on said brace-rod and toothed clutch-faces on said ball-race and brace-rod support, whereby the latter locks the ball-race, substantially as specified.

9. The combination of the slotted fork of a bicycle, and an axle adjustable fore and aft in said slot, with a washer fitting snugly to said axle, an eccentric-headed bolt engaging both with the fork and washer, and a nut for locking said bolt in position after adjustment, substantially as specified.

In testimony whereof I have signed my name to this specification in the presence of two subscribing witnesses.

JOHN PARKER.

Witnesses:
    JOS. H. KLEIN,
    FRANK E. BECHTOLD.